(12) United States Patent
Nogueira Dias da Silva

(10) Patent No.: US 8,796,876 B2
(45) Date of Patent: Aug. 5, 2014

(54) HYDROELECTRIC GENERATOR

(76) Inventor: Hernâni José Nogueira Dias da Silva, Felgueiras (PT)

( * ) Notice: Subject to any disclaimer, the term of this patent is extended or adjusted under 35 U.S.C. 154(b) by 0 days.

(21) Appl. No.: 13/519,757

(22) PCT Filed: Jun. 28, 2010

(86) PCT No.: PCT/IB2010/001565
§ 371 (c)(1),
(2), (4) Date: Jun. 28, 2012

(87) PCT Pub. No.: WO2011/080551
PCT Pub. Date: Jul. 7, 2011

(65) Prior Publication Data
US 2012/0280508 A1 Nov. 8, 2012

(30) Foreign Application Priority Data
Dec. 28, 2009 (PT) .......................................... 104908

(51) Int. Cl.
*F03B 13/00* (2006.01)
(52) U.S. Cl.
USPC ............................................................ 290/54
(58) Field of Classification Search
USPC ........................................ 290/52–54, 43–44
See application file for complete search history.

(56) References Cited

U.S. PATENT DOCUMENTS

| 8,382,425 | B2 * | 2/2013 | Griffin | 415/126 |
|---|---|---|---|---|
| 8,546,966 | B1 * | 10/2013 | Santos | 290/43 |
| 8,546,970 | B2 * | 10/2013 | Hallett | 290/54 |
| 8,581,432 | B2 * | 11/2013 | Rohrer | 290/53 |
| 2008/0012345 | A1 * | 1/2008 | Parker | 290/54 |
| 2008/0309089 | A1 * | 12/2008 | Lin | 290/54 |
| 2009/0322093 | A1 * | 12/2009 | Winius | 290/54 |
| 2010/0301610 | A1 * | 12/2010 | Leon | 290/54 |
| 2010/0327590 | A1 * | 12/2010 | Lee et al. | 290/52 |
| 2012/0013129 | A1 * | 1/2012 | Cornelius et al. | 290/54 |
| 2012/0235417 | A1 * | 9/2012 | Arntz | 290/55 |
| 2012/0261924 | A1 * | 10/2012 | Christensen | 290/54 |

FOREIGN PATENT DOCUMENTS

GB 2 223 063 A * 3/1990

* cited by examiner

*Primary Examiner* — Jean F Duverne
(74) *Attorney, Agent, or Firm* — Kile Park Reed & Houtteman

(57) ABSTRACT

This invention is made of a rotational hollow blade (11) turbine, which can be installed in watercourses for power generation. This system may include up to six propellers placed in hexagon shape, since this is the recommended shape for a better collection of the river flow, so that their movement does not obstruct the turbine rotation, and increases speed when immersing and emerging. The mentioned propellers are assembled on top of an axis of rotation, and the latter has an emission pinion (12) on both ends, which connects to a receiver pinion (13) placed inside a reduction gear box. Several turbines can be installed depending on the motive power of each hydric flow, and on the connection to two flow generators, one on each side, so that the power falling upon the turbine is regular and balanced.

11 Claims, 3 Drawing Sheets

HYDROELECTRIC GENERATOR

This application is the U.S. national phase application of PCT No. PCT/IB2010/001565.

FIELD OF THE INVENTION

This invention consists of a hydro generator and in particular but not exclusively describes a hydro generator whose installation and operation does not cause any environmental impact in the surrounding area.

STATE OF THE ART

Power made from running water has been explored since many years. However, traditional approaches imply disadvantages due to environmental factors such as:

overflow of the river banks that otherwise would be available to be used; landscape modification; loss for the local community that could live and work in the land close to the river; modification of river characteristics obstructing fish free flow;

river deviation widely affecting nature in neighbouring rural areas;

total or partial permanent river blockage for power generation is unfavourably affected by flow variation.

Thus, one of the objectives of this invention also encompasses the proposal of a hydro generating device which does not include the above mentioned disadvantages.

In order to resolve all the above described inconveniences, this invention advances a new concept of hydric generators, namely, the development of a device whose installation and operation do not imply environmental damage whatsoever.

OBJECTIVE OF THE INVENTION

The objective of this invention is that of developing a hydro generator capable of resolving all the above mentioned inconveniences, namely enabling that the environment is not damaged. It is also the objective of this invention the development of a versatile hydro generator capable of operating regardless of the local characteristics. Furthermore, it is also the objective of this invention the development of a power generating device easy to assemble and inexpensive to produce.

DESCRIPTION

This invention consists mainly of a rotational hollow blade turbine which can be installed in watercourses for power generation. This system may include up to six propellers placed in hexagon shape, since this is the recommended shape for a better collection of the river stream strength, so that their movement does not obstruct the turbine rotation, and increases speed when immersing and emerging. The mentioned propellers are assembled on top of an axis of rotation, and the latter has an emission pinion on both ends, which connects to a receiver pinion placed inside a reduction gear box. Several turbines can be installed depending on the motive power of each hydric flow, and on the connection to two flow generators, one on each side, so that the power falling upon the turbine is regular and balanced.

BRIEF DESCRIPTION OF THE DRAWINGS

Prior to describing the invention in detail, a short description of all figures is herein supplied.

(1) corresponds to the power transformer;
(2) indicates the stream direction;
(3) corresponds to electrical wire;
(4) and (5) concern respectively generator 1 and 2;
(5) and (7) concern respectively receiver and emission pinion;
(8) corresponds to generator supporting device;
(9) corresponds to transmission shaft (propeller—generator);
(10) corresponds to the supporting structure to the hydro generator shaft;
(11) corresponds to the turbine
(12) and (13) concern respectively receiver and emission pinion;
(14) corresponds to the transmission shaft supporting device;
(15) corresponds to the concrete platform;
(16) corresponds to the structure-platform connection.

Figure 1:
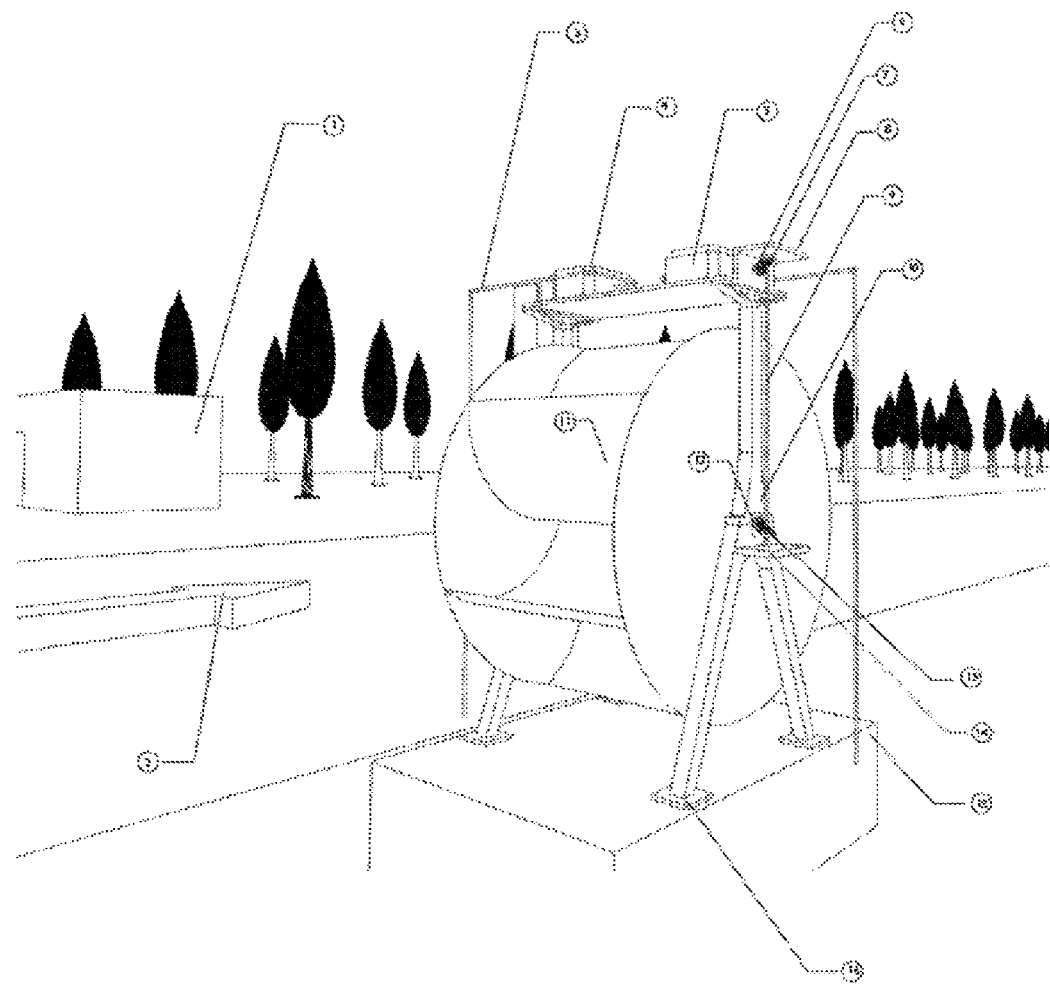
FIG. 1 shows an infra-structure representing the object of this invention, where.
Figure 2:
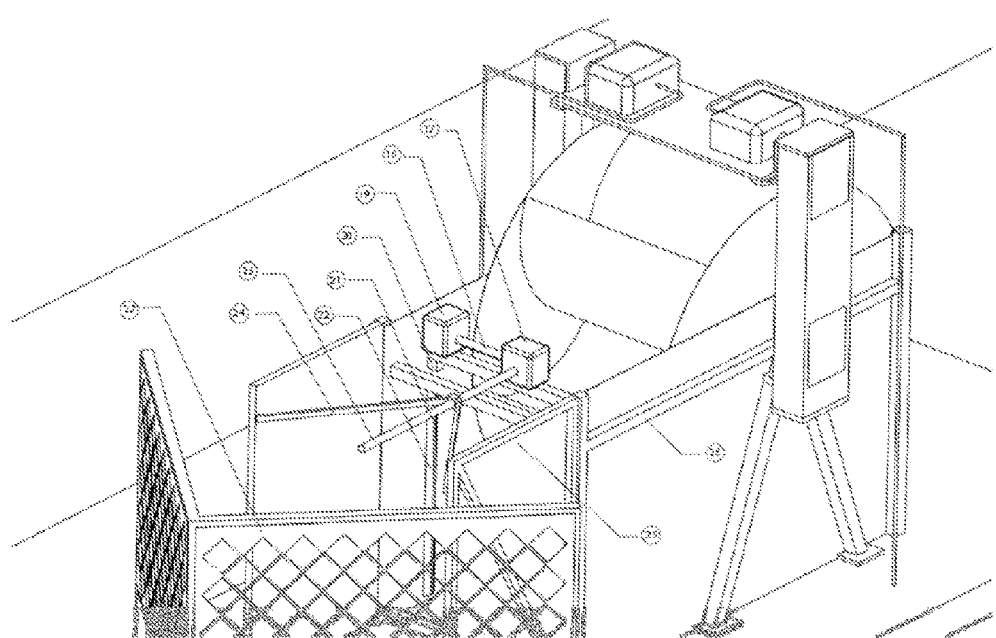
Figure 3:
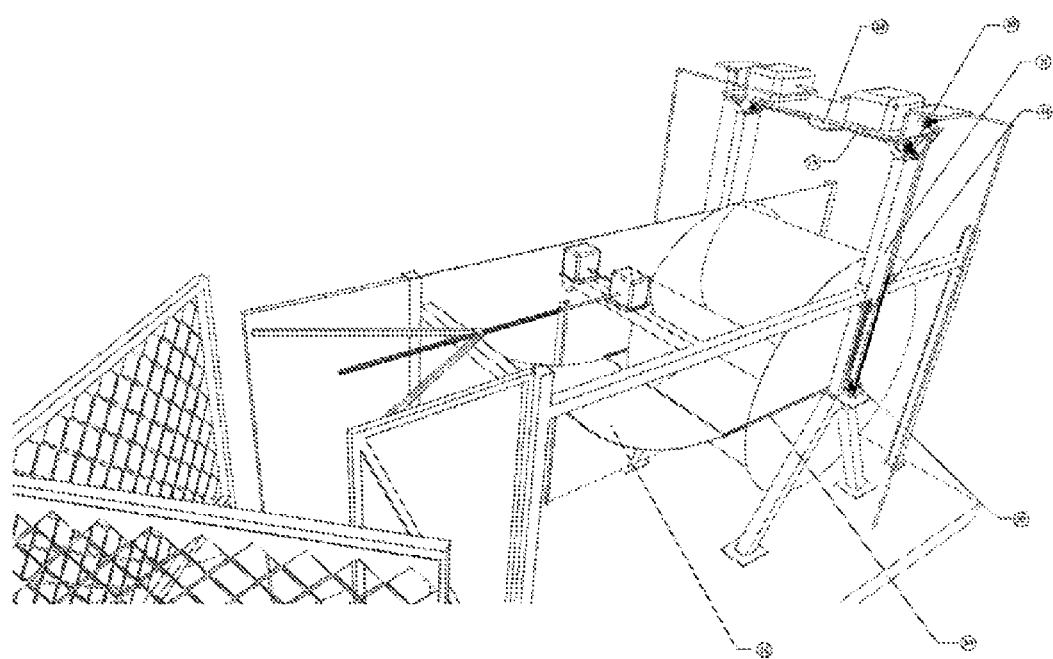

In FIG. 2 and FIG. 3, the hydro generator auxiliary structures are displayed:

(17) gate opening/closing engine;
(18) gate opening/closing transmission shaft;
(19) water level regulator;
(20) level check control box;
(21) water level check buoy;
(22) buoy supporting device;
(23) transmission shaft of gate engine;
(24) arms for gate opening;
(25) mobile gates for water level regulation;
(26) structure of the water level regulating system;
(27) protection net.

DETAILED DESCRIPTION

This invention consists of a device to use water motive power (2), for electrical power generation, made of a supporting steel (10) developed upon (16) one concrete structure (15), and fixed between both by a one-shaft rotational roller (14), which in turn is connected to a hollow blade turbine (11), which in turn is connected to a half angle plate transmission cogwheel (12), to a half angle plate admission cogwheel (13) containing half the cogs, connected to a rotational shaft (9), which has a half angle plate cogwheel (7) with twice as much cogs of the cogwheel (6), which in turn fits in a half angle plate admission cogwheel (6) with half of the wheel cogs (7), in twofold by a transmission shaft to a rotation gearbox (5 and 4) which is hold by the supporting bar (8), connected to a transmission shaft, which in turn is connected to a device (5 and 4) converting the shaft rotation into power, and for a better development of the generated power directs it through a device (3) which transforms the power received (1). The system which is herein represented for the generator (5) is simultaneously applied to generator (4). One should keep in mind that the device contains two simultaneous generators, which allows doubling the power generated.

Adjacently, there is a system which monitors the rise and lowering of the river bed stream by means of two mobile gates (25). Depending on the flow of the river stream, gate opening and closing (25) is controlled by two arms (24) connected to the rotational shaft (23). This shaft (23) is connected to an engine (17) which in turn is connected to a monitoring engine (19), by a shaft (18). The engine (19) is connected to the water level check system (20), which is linked to a buoy supporting device (22). The buoy (21) transmits the rise and the lowering of water levels to the control check box (20) thus accurately monitoring the height of the river bed. Upstream there is a squared protection net (27) avoiding eventual flow of big objects and thus fully protecting the turbine. This invention is also equipped with a variable stream system enabling the turbine rise and lowering, complemented with a turbine rise regulating engine (28), engine transmission shaft to the rise shaft (29), transmission between the engine shaft and the rise shaft (30), structure with fissure of the rise system (31) from which the turbine regulation movement is made, shaft for the turbine rise movement (32), support to the turbine rise system (33), supporting arm for the plate rise (34), control plate for the hydric flow level (35).

These hydro generators can be installed in line and side by side one to the other, with no need for significant distances between them, or if convenient they can be linked by gates (just like channels), eventually avoiding in most cases dam construction, favouring the use of hydric streams enabling still the installation under bridges, in river aqueduct falls as well as in channels. This equipment has proven to be profitable due to its permanent operation, unlike other renewable energy sources. Its manufacturing and assembly is simple, low cost and environment-friendly. Rivers can still be navigated after the installation of this equipment.

The operation of the hydro generator described does not have any impact in water pollution. On the contrary, water movement caused by the rotational blades enables water purification, vaporization and oxygenation processes, which are important for our Planet. This power generation system includes one mechanism linked to the hydro generator originating the river flow height balancing, thus not damaging the natural river ecosystem. Another characteristic of the system is the regulation of the river bed level control made by the opening and closing of two parallel gates. Such gates aim to keep the same water level up to the turbine axis, so that a regular inertia and motive power is projected upon them. The system also comprehends gate closing for machine stoppage and protection in case of flood, and a protection net to avoid any object to damage the turbine operation. Since there is the possibility that some river bed heights may vary significantly form place to place, where the gates themselves cannot control the regulation system of water flow into the turbine, a technology based on a stream regulation platform has been designed, enabling the turbine to be constantly operating, both in movement and in projected maximum height.

The invention claimed is:

1. A hydro generator, useful for converting water flow in a stream into electrical power, comprising:
   a platform-supporting structure,
   a turbine,
   a rotational transmission system, and
   an electric generator system,
   said platform-supporting structure further comprising:
      a supporting structure mounted upon a platform and,
      said supporting structure providing physical support for said turbine, said rotational transmission system and said electric generator system;
   said turbine further comprising:
      a central axis around which said turbine rotates,
      said axis having a first transmission cogwheel located at an end of said axis, and
      said axis having six equally spaced concave blades mounted parallel to and extending out from said axis;
   said rotational transmission system further comprising:
      a rotational shaft having a first and a second end, in which, located at said first end is a first admission cogwheel and located at said second end is a second transmission cogwheel;
      wherein said rotational shaft cogwheels are connected such that said cogwheel at said rotational shaft first end is connected to said cogwheel at said turbine axis and said cogwheel on said rotational shaft second end is connected to a second admission cogwheel located on a transmission shaft first end,
      wherein said rotational transmission system functions to mechanically transmit turbine rotation to transmission shaft rotation; and
   said electric generator system further comprising:
      said transmission shaft having said first end and a second end and located at said transmission shaft second end is a rotation gear box,
      said rotation gear box is connected to an electric generator such that transmission shaft rotation causes said electric generator to generate electric power;
   wherein said water flow in a stream is converted into electric power by said hydro generator.

2. The hydro generator as defined in claim 1, further comprising:
   said turbine axis has cogwheels at both ends and corresponding rotational shaft transmission systems and electric generator systems at both ends.

3. The hydro generator as defined in claim 1, further comprising:
   two mobile gates which open in response to lowering of the stream water level and close in response to the rising and the stream water level.

4. The hydro generator as defined in claim 3, further comprising:
   said mobile gates opening and closing is controlled by two arms connected to a rotational shaft which in turn is connected to a water level check system which monitors the height of the stream and closes the gates when the water level rises and opens the gates when the water level falls.

5. The hydro generator as defined in claim 4, further comprising:
   said water level check system is equipped with a buoy in contact with the water surface such that the buoy rises and lowers with the water level and transmits the water level information to a control check box which, in turn operates an engine that opens and closes the mobile gates.

6. The hydro generator as defined in claim 5, further comprising:
   the water level information is transmitted to the control check box by a mechanical system or a wireless communication system.

7. The hydro generator as defined in claim 1, further comprising:
   a protective net located upstream of the turbine that intercepts objects and thus protects the turbine from damage.

8. The hydro generator as defined in claim 1, further comprising:
   a variable water level system enabling the turbine to move up or down as the stream water level rises or lowers, to keep the turbine at an optimal level relative to the water level.

9. The hydro generator as defined in claim 8, wherein said variable water level system further comprises:
   said turbine up or down movement is as a result of said turbine support structure being connected to a rotational shaft with a screw movement, such that rotation of said shaft in one direction moves said turbine support structure up and rotation of said shaft in the opposite direction moves said turbine support structure down.

10. The hydro generator as defined in claim 3, further comprising:

a protective net located upstream of the turbine that intercepts objects and thus protects the turbine from damage.

11. The hydro generator as defined in claim 8, further comprising:
a protective net located upstream of the turbine that intercepts objects and thus protects the turbine from damage.

* * * * *